(12) United States Patent
Hoshi et al.

(10) Patent No.: US 10,066,135 B2
(45) Date of Patent: Sep. 4, 2018

(54) ADHESIVE COMPOSITION AND ADHESIVE SHEET USING THE SAME

(71) Applicant: DAI NIPPON PRINTING CO., LTD., Tokyo-to (JP)

(72) Inventors: Kentaro Hoshi, Ibaraki (JP); Junichi Kuroki, Saitama (JP); Takahisa Taniguchi, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 104 days.

(21) Appl. No.: 14/651,393

(22) PCT Filed: Dec. 28, 2012

(86) PCT No.: PCT/JP2012/084164
§ 371 (c)(1),
(2) Date: Oct. 5, 2015

(87) PCT Pub. No.: WO2014/103040
PCT Pub. Date: Jul. 3, 2014

(65) Prior Publication Data
US 2016/0032157 A1   Feb. 4, 2016

(51) Int. Cl.
| | | |
|---|---|---|
| C09J 163/00 | (2006.01) | |
| C09J 7/02 | (2006.01) | |
| C09J 133/08 | (2006.01) | |
| C09J 153/00 | (2006.01) | |
| C09J 133/10 | (2006.01) | |

(Continued)

(52) U.S. Cl.
CPC ............ *C09J 163/00* (2013.01); *C08L 33/06* (2013.01); *C08L 53/00* (2013.01); *C08L 53/005* (2013.01); *C08L 63/00* (2013.01); *C09J 5/06* (2013.01); *C09J 7/10* (2018.01); *C09J 7/405* (2018.01); *C09J 133/08* (2013.01); *C09J 133/10* (2013.01); *C09J 153/00* (2013.01); *C09J 2400/163* (2013.01); *C09J 2400/226* (2013.01); *C09J 2400/283* (2013.01); *C09J 2433/00* (2013.01);

(Continued)

(58) Field of Classification Search
None
See application file for complete search history.

(56) References Cited

U.S. PATENT DOCUMENTS

2011/0003947 A1* 1/2011 Kishi .................. C08F 297/026
525/92 H
2011/0184091 A1 7/2011 Mizuki et al.
(Continued)

FOREIGN PATENT DOCUMENTS

| CN | 101501132 A | 8/2009 |
| EP | 2522704 A1 | 11/2012 |

(Continued)

OTHER PUBLICATIONS

Machine translation JP 2010-070597 (2010).*
(Continued)

*Primary Examiner* — Alexandre F Ferre
(74) *Attorney, Agent, or Firm* — Oliff PLC

(57) ABSTRACT

An adhesive composition includes an epoxy-based resin, an acryl-based resin, and a curing agent. The acryl-based resin includes a triblock copolymer of methyl methacrylate-butyl acrylate-methyl methacrylate, or a modified product thereof.

19 Claims, 1 Drawing Sheet

(51) Int. Cl.
*C09J 5/06* (2006.01)
*C08L 33/06* (2006.01)
*C08L 53/00* (2006.01)
*C08L 63/00* (2006.01)
*C09J 7/40* (2018.01)
*C09J 7/10* (2018.01)

(52) U.S. Cl.
CPC ........ *C09J 2453/00* (2013.01); *C09J 2463/00* (2013.01)

(56) References Cited

U.S. PATENT DOCUMENTS

| | | | |
|---|---|---|---|
| 2011/0253943 A1 | 10/2011 | Liang et al. | |
| 2014/0100320 A1 | 4/2014 | Nagano et al. | |

FOREIGN PATENT DOCUMENTS

| | | | | |
|---|---|---|---|---|
| JP | S61-188478 A | 8/1986 | | |
| JP | H03-143980 A | 6/1991 | | |
| JP | H04-189885 A | 7/1992 | | |
| JP | H04-189887 A | 7/1992 | | |
| JP | 2002-246253 A | 8/2002 | | |
| JP | 2003-055632 A | 2/2003 | | |
| JP | 2003-082034 A | 3/2003 | | |
| JP | 2003-208010 A | 7/2003 | | |
| JP | 2003-226856 A | 8/2003 | | |
| JP | 2006-019521 A | 1/2006 | | |
| JP | 2006-274306 A | 10/2006 | | |
| JP | 2009-501258 A | 1/2009 | | |
| JP | 2009-172919 A | 8/2009 | | |
| JP | 2010-095632 A | 4/2010 | | |
| JP | 2010070597 A | * | 4/2010 | |
| JP | 2010-229212 A | 10/2010 | | |
| JP | WO 2011083835 A1 | * | 7/2011 | ............ C09J 133/20 |
| JP | 2012-528205 A | 11/2012 | | |
| JP | 2013-006974 A | 1/2013 | | |
| WO | 2008/001705 A1 | 1/2008 | | |
| WO | 2009/101961 A1 | 8/2009 | | |
| WO | 2012/039456 A1 | 3/2012 | | |

OTHER PUBLICATIONS

Apr. 26, 2016 Extended European Search Report issued in European Application No. 12891286.2.
Jul. 19, 2016 Office Action issued in Chinese Patent Application No. 201280078196.5.
Chen, Jing, et al., "Epoxy Modified with Triblock Copolymers: Morphology, Mechanical Properties and Fracture Mechanisms," Journal of Materials Science, 2012, 47:4546-4560.
May 22, 2015 Office Action issued in Japanese Application No. 2015-046950.
Dec. 5, 2014 International Preliminary Report on Patentability issued in PCT Application No. PCT/JP2012/084164.
Mar. 31, 2015 Office Action issued in Japanese Application No. 2015-046950.
Dec. 19, 2014 Office Action issued in Japanese Application No. 2011-141076.
Feb. 10, 2015 Decision of Patent Grant issued in Japanese Application No. 2011-141076.
Mar. 12, 2013 International Search Report issued in PCT Application No. PCT/JP2012/084164.
Dec. 13, 2016 Decision of Trial issued in Japanese Patent Application No. 2015-46950.
Oct. 6, 2017 Office Action issued in Japanese Patent Application No. 2016-224426.
Jun. 17, 2016 Office Action issued in Japanese Patent Application No. 2015-164106.
Jun. 1, 2018 Office Action issued in European Patent Application No. 12 891 286.2.

* cited by examiner

ADHESIVE COMPOSITION AND ADHESIVE SHEET USING THE SAME

BACKGROUND

1. Technical Field

The present disclosure relates to an adhesive composition, more specifically, an adhesive composition that enables adhesion between metals, between a metal and an organic material, and between organic materials.

2. Background

Examples of conventional bonding methods for joining two adherends include interlocking, welding, and adhesion using an adhesive or a sticker, and these methods are frequently used in their fields depending on their uses. In recent years, in uses related to transporters such as automobiles, weight saving of the automobile body has advanced, and hybrid vehicles and electric vehicles are becoming popular as solutions to global warming by, for example, reduction of emission of the carbon dioxide gas $CO_2$. Accordingly, aluminum, magnesium, and FRPs (CFRP: Carbon Fiber Reinforced Plastics, GFRP: Glass Fiber Reinforced Plastics) are becoming more frequently used for the automobile body because of their light weights.

In conventional welding processes, welding of different kinds of materials such as aluminum and iron is very difficult, and melding itself is impossible in cases of FRPs of glass fibers and carbon fibers. Thus, a method for bonding these materials (adherends) with a bonding strength equivalent to that achieved by welding is required. As a method for bonding materials which cannot be bonded by welding or the like, a method using an adhesive may be employed. Adhesives used for bonding such materials are required, for example, to be capable of achieving adhesion between metals, between a metal and an organic material, and between an organic material and an organic material, to achieve a bonding strength sufficient for structural uses, and to provide adhesion whose strength is not deteriorated by temperature changes.

As adhesives that satisfy the above requirements, thermosetting resins such as epoxy resins are generally used. However, although the mechanical strength of the resin itself of an epoxy adhesive after curing is high, the resin has poor toughness, and, in cases where an epoxy adhesive is used for a use such as an aircraft or an automobile, the problem of a decrease in the bonding strength sometimes occurs due to brittle fracture. In order to solve such a problem, addition of a thermo-setting resin or the like to an epoxy resin is attempted to provide an epoxy adhesive having flexibility (e.g., JP 2003-82034 A).

However, in cases where a thermo-setting resin having flexibility is used for an epoxy adhesive, thermal resistance of the adhesive is deteriorated, so that the adhesive cannot be used for uses in which thermal resistance is required, which is problematic.

DOCUMENT

Patent Document

Patent Document 1: JP 2003-82034 A

SUMMARY

The present inventors discovered that, by addition of a specific acryl-based resin to an epoxy-based resin, an adhesive which has toughness and can maintain excellent bonding strength even under a high-temperature environment can be realized. The present invention is based on such a discovery.

Accordingly, an object of the present invention is to provide an adhesive composition that enables adhesion between metals, between a metal and an organic material, and between an organic material and an organic material, which adhesive composition has toughness and can maintain excellent bonding strength even under a high-temperature environment.

Another object of the present invention is to provide an adhesive sheet using the adhesive composition described above.

The adhesive composition in accordance with some embodiments is an adhesive composition comprising an epoxy-based resin, an acryl-based resin, and a curing agent, the acryl-based resin comprising a triblock copolymer of methyl methacrylate-butyl acrylate-methyl methacrylate, or a modified product thereof.

The adhesive sheet according to another embodiment comprises a first release paper, an adhesive layer, and a second release paper laminated in this order, which adhesive layer comprises the adhesive composition described above.

The adhesion method according to another embodiment is a method for bonding a first adherend and a second adherend using the adhesive sheet described above, which method comprises the steps of:

removing the first release paper and the second release paper from the adhesive sheet to expose the adhesive layer;

sandwiching the adhesive layer between the first adherend and the second adherend to temporarily fix the first adherend and the second adherend; and curing the adhesive layer by heating to adhere the first adherend and the second adherend.

DETAILED DESCRIPTION

Figure 1:
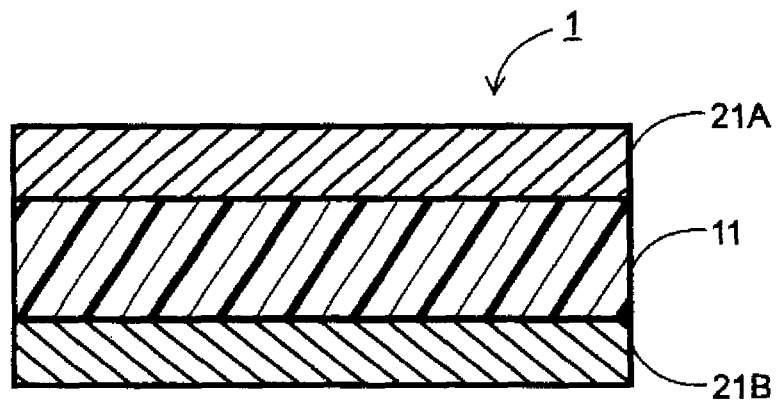
FIG. 1 is a schematic cross-sectional view of an adherent sheet of the disclosed embodiments.

In some embodiments, the composition comprises an epoxy-based resin, an acryl-based resin, and a curing agent. The components constituting the adhesive composition are described below.

<Epoxy-Based Resin>

The epoxy-based resin used in the adhesive composition means a resin prepared by curing of a prepolymer containing at least one epoxy group and/or glycidyl group by cross-linking polymerization using a curing agent. Examples of such an epoxy-based resin include epoxy resins, for example, bisphenol type epoxy resins such as bisphenol A type epoxy resins and bisphenol F type epoxy resins; novolak type epoxy resins such as novolak epoxy resins and cresol novolak epoxy resins; biphenyl type epoxy resins; stilbene type epoxy resins; triphenol methane type epoxy resins; alkyl-modified triphenol methane epoxy resins; triazine nucleus-containing epoxy resins; and dicyclopentadiene-modified phenol type epoxy resins; and also include novolak type phenol resins such as phenol novolak resins, cresol novolak resins, and bisphenol A novolak resins; phenol resins such as resol phenol resins; urea resins; triazine ring-containing resins such as melamine resins; unsaturated polyester resins; bismaleimide resins; polyurethane resins; diallyl phthalate resins; silicone resins; resins having a benzoxazine ring; and cyanate ester resins. In some embodiments, among these epoxy-based resins, epoxy resins having a rigid structure such as a biphenyl skeleton, bisphenol skeleton, or stilbene skeleton as a backbone are preferred. Bisphenol type epoxy resins are more preferred, and bisphenol A type epoxy resins are especially preferred.

The bisphenol A type epoxy resins described above are either in a liquid state at normal temperature or in a solid state at normal temperature depending on the repeat number of the bisphenol skeleton. Bisphenol A type epoxy resins having 1 to 3 backbones are in a liquid state at normal temperature, and bisphenol A type epoxy resins having 2 to 10 backbones are in a solid state at normal temperature. Such low-molecular-weight bisphenol A type epoxy resins have crystallinity, and, even in cases where such a resin is crystallized and in a solid state at normal temperature, the resin rapidly melts at a temperature of not less than the melting point, and becomes a low-viscosity liquid. Thus, in the process of bonding of adherends, the adhesive closely contacts with the adherends under heat, and curing of the adhesive then causes the adhesive to tightly adhere to the adherends, so that the bonding strength can be increased. Since such a bisphenol A type epoxy resin having a relatively low molecular weight has a high crosslink density, the resin has high mechanical strength, high chemical resistance, high curing properties, and low hygroscopicity (because the free volume of the resin is small).

In some embodiments, it is preferred to use a combination of the bisphenol A type epoxy resin which is in a solid state at normal temperature and the bisphenol A type epoxy resin which is in a liquid state at normal temperature described above as the bisphenol A type epoxy resin. By the combined use of the resins which is in a solid state and which is in a liquid state at normal temperature, flexibility can be obtained while mechanical strength is maintained. Thus, flexibility can be obtained while the inherent mechanical strength of the resin (adhesive composition) is maintained. As a result, the strength of bonding between the adherends can be increased. The bisphenol A type epoxy resin which is in a solid state at normal temperature preferably has a glass transition temperature within the range of 50 to 150° C. from the viewpoint of the mechanical strength and the thermal resistance. More specifically, examples of the bisphenol A type epoxy resins having 1 to 3 backbones which are in a liquid state at normal temperature include JER828, manufactured by Japan Epoxy Resins Co. Ltd., and examples of the bisphenol A type epoxy resins having 2 to 10 backbones which are in a solid state at normal temperature include JER1001, manufactured by Japan Epoxy Resins Co. Ltd.

The bisphenol A type epoxy resin which is in a solid state at normal temperature and the bisphenol A type epoxy resin which is in a liquid state at normal temperature are preferably contained at a mixing ratio by mass of 100:300 to 300:100 although the ratio may vary depending on the use of the adhesive. In cases where the mixing ratio of those resins are within the range described above, an adhesive having higher bonding strength can be obtained.

<Acryl-Based Resin>

As the acryl-based resin contained in the adhesive composition, a triblock copolymer of methyl methacrylate-butyl acrylate-methyl methacrylate or a modified product thereof is used. By adding such a triblock copolymer composed of a methacrylic acid ester polymer block (which may be hereinafter referred to as MMA) and a butyl acrylate polymer block (which may be hereinafter referred to as BA) to the epoxy-based resin described above, an adhesive having toughness and capable of maintaining excellent bonding strength even under a high-temperature environment can be realized. Its cause is unclear, but can be assumed as follows.

In MMA-BA-MMA triblock copolymers, the MMA portion plays a role as a "hard" segment, and the BA portion plays a role as a "soft" segment. In some adhesives, an acryl-based resin is added to an epoxy-based resin in order to give toughness (flexibility) to the epoxy-based resin. However, the addition of the acrylic resin leads to decreased thermal resistance of the adhesive itself. In cases where an acryl-based resin containing both a "hard" segment and a "soft" segment is used, the "hard" segment portion contributes to the thermal resistance, and the "soft" segment portion contributes to the toughness or flexibility. It is thus thought that the adhesive having toughness and capable of maintaining excellent bonding strength even under a high-temperature environment can be realized with the resin.

The MMA-BA-MMA triblock copolymers can be produced by general living radical polymerization. In particular, from the viewpoint of simple control of the polymerization reaction and the like, the production can be preferably carried out by atom transfer radical polymerization. Atom transfer radical polymerization is a polymerization method in which an organic halide or a sulfonyl halide compound is used as an initiator, and a metal complex is used as a catalyst. In cases where a MMA-BA-MMA triblock copolymer is produced by living radical polymerization, examples of the method include a method in which monomer units are sequentially added, a method in which a polymer synthesized in advance is used as a polymer initiator for polymerizing the subsequent polymer block, and a method in which separately polymerized polymer blocks are linked by a reaction. It is preferred to produce the MMA-BA-MMA triblock copolymer by the method in which monomer units are sequentially added, The method in which the MMA-BA-MMA triblock copolymer is produced by sequential addition of monomer units varies depending on the order of addition of the methacrylic acid ester constituting the MMA block and the butyl acrylate constituting the BA block. That is, there is a method in which polymerization of methacrylic acid ester monomers is first carried out, followed by addition of butyl acrylate monomers, and a method in which polymerization of butyl acrylate monomers is first carried out, followed by addition of methacrylic acid ester monomers. The polymerization can be more easily controlled in the method in which polymerization of butyl acrylate monomers are first carried out, followed by allowing polymerization of the MMA block from the polymerization end of the BA block. The ratio between MMA and BA can be controlled by the amount of monomers fed for the living radical polymerization. In terms of the ratio between the MMA block and the BA block in the MMA-BA-MMA triblock copolymer, a higher BA block ratio leads to increased toughness and flexibility of the adhesive, while a higher MMA block ratio leads to increased thermal resistance of the adhesive. In some embodiments, from the viewpoint of toughness and flexibility, the ratio between the MMA block and the BA block is preferably 1:1 to 50:1 in terms of the number of monomer units.

The MMA-BA-MMA triblock copolymer described above may be a modified product in which a carboxylic acid(s) and/or a functional group(s) such as an acrylamide group is/are introduced in a part of the MMA blocks. By use of such a modified product, the thermal resistance further increases, and compatibility with the epoxy-based resin described above also increases, leading to an increased bonding strength.

In cases where an MMA-BA-MMA triblock copolymer is added to the epoxy-based resin described above, self-organization occurs using the epoxy-based resin as a matrix, since the MMA block portion is compatible with the epoxy-based resin, while the BA block portion is not compatible with the epoxy-based resin. As a result, a sea-island structure in which the epoxy-based resin is the sea and the acryl-based resin is the island appears. Because of the appearance of such a sea-island structure, interfacial failure can be avoided, and excellent bonding strength can be maintained.

In order to allow appearance of such a sea-island structure, it is preferred to mix the epoxy-based resin and the acryl-based resin (MMA-BA-MMA triblock copolymer) at a ratio by mass of 100:4 to 100:20. By the mixing of these resins at such a ratio, the acryl-based resin (islands) is dispersed in the epoxy-based resin (sea) such that the acryl-based resin forms nanoparticles.

<Curing Agent>

The reaction between the acryl-based resin and the epoxy-based resin proceeds under heat or the like to cause curing of the adhesive composition. In some embodiments, in order to promote the curing reaction, a curing agent is included in the adhesive composition. Examples of the curing agent include amine-based curing agents of, for example, aliphatic polyamines such as diethylenetriamine (DETA), triethylenetetramine (TETA), and metaxylenediamine (MXDA); aromatic polyamines such as diaminodiphenylmethane (DDM), m-phenylenediamine (MPDA), and diaminodiphenylsulfone (DDS); and polyamine compounds including dicyandiamide (DICY) and organic acid dihydrazide; acid anhydride-based curing agents of, for example, alicyclic acid anhydrides (liquid acid anhydrides) such as hexahydrophthalic anhydride (HHPA) and methyltetrahydrophthalic anhydride (MTHPA); and aromatic acid anhydrides such as trimellitic anhydride (TMA), pyromellitic dianhydride (PMDA), and benzophenone tetracarboxylic acid (BTDA); and phenol-based curing agents of, for example, phenol resins. Dicyandiamide (DICY) is especially preferred since it is a latent curing agent, and therefore has excellent shelf stability and several weeks of pot life under storage at room temperature. As a curing accelerator, imidazole may be contained.

The content of the curing agent in the adhesive composition is preferably 1 to 30 parts by mass when the content of the epoxy-based resin is 140 to 260 parts by mass, and the content of the acryl-based resin is 10 to 50 parts by mass. In cases where the mixing ratio of the curing agent is smaller than the lower limit of this range, the thermal stability after bonding is low, and the bonding strength tends to decrease due to temperature changes. In cases where the content of the curing agent exceeds the upper limit of this range, when an adhesive sheet is stored until bonding to adherends, the shelf stability (pot life) during the storage period is low. Moreover, since unreacted curing agent remains after curing of the adhesive, the adhesive strength decreases, which is problematic.

For improvement or modification of the processability, thermal resistance, weatherability, mechanical properties, dimensional stability, antioxidative properties, sliding properties, releasability, incombustibility, antifungal properties, electric properties, strength, and/or the like, the adhesive composition may further contain, if necessary, a lubricant, plasticizer, bulking agent, filler, antistatic agent, antiblocking agent, cross-linking agent, antioxidant, ultraviolet absorber, light stabilizer, coloring agent such as a dye and/or pigment, and/or the like. In addition, the adhesive composition may contain a coupling agent(s) such as a silane-based, titanium-based, and/or aluminum-based coupling agent(s), if necessary. By adding any of these agents to the adhesive composition, adhesion between the resin and the adherends, and between the resin and the later-described core can be improved.

The adhesive composition used in some embodiments can be prepared by mixing, and, if necessary, kneading and dispersing, the components described above, to provide an adhesive. The method for mixing or dispersing the components is not limited, and examples of the method which may be applied include those using a normal kneader/disperser such as a 2-roll mill, 3-roll mill, pebble mill, trommel, Szegvari attritor, high-speed impeller disperser, high-speed stone mill, high-speed impact mill, Despa, high-speed mixer, ribbon blender, co-kneader, intensive mixer, tumbler, blender, disperser, homogenizer, or ultrasonic disperser. Preferably, in cases where a plurality of types of hard epoxy-based resins are used, mixing and stirring of these resins is first carried out, and a curing agent is then mixed with the resulting mixture. The obtained mixture is stirred, and then diluted with a solvent. A soft epoxy-based resin is mixed with the resulting dilution, and the mixture is then stirred, followed by mixing with an acryl-based resin and stirring of the resulting mixture.

<Adhesive Sheet>

Figure 2:
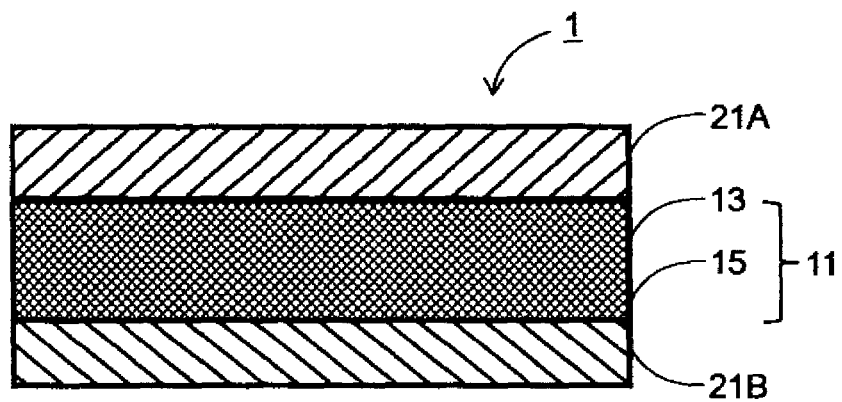
FIG. 2 is a schematic cross-sectional view of another adherent sheet of the disclosed embodiments.

As shown in FIG. 1, an adhesive sheet of the disclosed embodiments has a layer constitution in which the first release paper and the second release paper are provided on both sides of the adhesive layer composed of the adhesive composition. In the present description, the first release paper 21A and the second release paper 21B are collectively referred to as release paper 21. As shown in FIG. 2, the adhesive layer may further contain a core, and the core may be impregnated with the adhesive. The core is preferably a woven fabric or a non-woven fabric, and various known woven fabrics and non-woven fabrics can be used. Examples of the core include heat-resistant plastic fibers of a liquid crystal polymer or the like; glass fibers; aramid fibers; and carbon fibers. Woven fabrics and non-woven fabrics constituted by such cores can be used.

In cases where the adhesive layer contains a core, by laminating the later-described first release paper 21 and the core 15 to each other and allowing the resulting laminate to travel using a coating machine while the adhesive 13 composition described above is applied to the core 15 surface, the core 15 can be impregnated with the adhesive composition. By laminating the second release paper 21B on the coated surface after drying, an adhesive sheet 1 can be obtained.

Examples of the method of the application of the adhesive composition to the release paper include, but are not limited to, roll coating, reverse roll coating, transfer roll coating, gravure coating, gravure reverse coating, comma coating, rod coating, blade coating, bar coating, wire bar coating, die coating, lip coating, and dip coating. The composition may be applied to the release surface of the first release paper 21A, or to the core 15 surface of the laminate of the first release paper 21A and the core 15 by the above-described coating method, followed by drying the resultant and laminating the second release paper 21B thereon. The viscosity of the composition (application liquid) is adjusted to about 1 to 20,000 centistokes (25° C.), preferably 1 to 2000 centistokes. In cases of application to the core 15 by impregnation, the viscosity is preferably low, and 1 to 1000 centistokes.

The first release paper 21A and the second release paper 21B may be the same or different. As the release paper 21, a known material such as a release film, separate paper, separate film, sepa paper, release film, or release paper may be preferably used. Alternatively, a release layer(s) may be formed on one or both sides of a release paper base material such as a high quality paper, coated paper, impregnated paper, or plastic film, and the resultant may be used. The release layer is not limited as long as it is a releasable material, and examples of the release layer include silicone resins, organic resin-modified silicone resins, fluorine resins, amino alkyd resins, melamine-based resins, acryl-based resins, and polyester resins. These resins may be any of an emulsion type, solvent type, and solventless type.

The release layer is formed by applying a coating liquid containing a release layer component dispersed and/or dissolved therein, to one surface of the release paper base material, and then subjecting the resultant to drying under heat and/or curing. As the method of the application of the coating liquid, an arbitrary known application method such as roll coating, gravure coating, or spray coating may be used. The release layer may be formed, as required, on the entire area or a partial area on at least one side of the base material film.

The peel force of the first and second release papers from the adhesive sheet is preferably about 1 to 2000 mN/cm, more preferably 100 to 1000 mN/cm. In cases where the peel force of the release layer is less than 1 mN/cm, the peel force from the adhesive sheet or the adherend is weak, and peeling or partial floating may occur. In cases where the peel force is greater than 2000 mN/cm, the peel force of the release layer is strong, and the layer cannot be easily peeled off. From the viewpoint of stable releasability and processability, an addition- and/or polycondensation-type curable silicone resin for release paper containing polydimethylsiloxane as a major component is preferred.

<Method of Adhesion of Adherends>

For bonding to adherends, the first release paper 21A and the second release paper 21B of the adhesive sheet 1 are removed by peeling off, to expose the adhesive layer 11. The exposed adhesive layer 11 is arranged between a first adherend and a second adherend which may be the same or different, and the adherends are held by the adhesiveness of the adhesive layer 11. Subsequently, the adhesive layer 11 is cured under heat or under pressure and heat, to allow firm adhesion of the first adherend and the second adherend. Thus, by using the adhesive sheet, adherends can be temporarily fixed using the initial adhesiveness, and this can be followed by heat curing of the adhesive sheet by a batch method, to adhere the adherends. Therefore, the process of preheat and the like can be omitted, and productivity can be remarkably improved.

Examples of the adherends include, but are not limited to, metals, inorganic materials, organic materials, composite materials composed of a combination of these materials, and laminated materials.

The heating temperature during the curing is about 60° C. to 250° C., preferably 100° C. to 180° C. The heating time is 1 to 240 minutes, preferably 10 to 120 minutes. The adhesive layer 11 of a cured adhesive sheet 1 has initial adhesiveness, and adherends can be held during the operation by using only the adhesive force without carrying out a process of preheat or the like. Thus, good operability and low cost can be achieved. By selecting the material of the adhesive layer and its mixing ratio, adhesion can be achieved between metals, between a metal and an organic material, and between an organic material and an organic material. Moreover, the epoxy-based resin gives strong bonding strength, and this bonding strength is less likely to be deteriorated by temperature changes. Further, the acryl-based resin makes the composition less fragile, and gives excellent shear strength, and high impact resistance and thermal resistance. Therefore, the composition can be used for structural uses.

<Laminated Body>

By using the adhesive sheet, strong bonding can be achieved for materials (adherends) which can be hardly adhered, such as FRPs of glass fibers and carbon fibers, different kinds of metals, and the like. For example, laminated bodies of aluminum and a metal such as iron, and laminated bodies of FRPs or CFRPs can be obtained. Since these laminated bodies can retain excellent bonding strength without being influenced by temperature changes, and have low fragility, excellent shear strength, high impact resistance, and high thermal resistance, they can be used not only in the fields such as automobiles, aircrafts, and ships, but also in the fields such as electronic devices, electronic device packages, home electrical appliances, infrastructure-related constructs, lifeline building materials, and general building materials.

EXAMPLES

The preferred embodiments are described below in more detail by way of Examples. However, the present invention is not limited to the contents of these Examples. The amount of each composition in each layer is represented by parts by mass of the solid content excluding the solvent.

Examples 1 to 14 and Comparative Examples 1 to 5

Preparation of Adhesive Composition

According to a composition shown in Table 1 shown below, a curing agent was added to a bisphenol A type epoxy resin, and the resulting mixture was mixed using a stirrer, followed by adding an acryl-based resin to the mixture and then stirring the resulting mixture, thereby preparing each adhesive. In Table 1 shown below, JER828, JER1001, and JER1009 represent bisphenol A type epoxy resins manufactured by Mitsubishi Chemical Corporation;

W-197C represents an ethyl acrylate-methyl methacrylate copolymer manufactured by Negami Chemical Industrial Co., Ltd.;

SK-Dyne 1495 represents an acryl-vinyl acetate copolymer manufactured by Soken Chemical & Engineering Co., Ltd.;

LC#6500 represents methyl polymethacrylate manufactured by Toei Kasei Co., Ltd.;

SM4032XM10 represents a carboxyl-containing modified methyl methacrylate-butyl acrylate-methyl methacrylate triblock copolymer manufactured by Arkema;

M22 represents a methyl methacrylate-butyl acrylate-methyl methacrylate triblock copolymer manufactured by Arkema;

M22N represents a modified methyl methacrylate-butyl acrylate-methyl methacrylate triblock copolymer in which an acrylamide group is introduced into a part of the MMA blocks, manufactured by Arkema;

KBM-403 represents a silane coupling agent manufactured by Shin-Etsu Chemical Co., Ltd.;

DICY7 represents dicyandiamide manufactured by Mitsubishi Chemical Corporation;

HIPA-2E4MZ represents inclusion imidazole manufactured by Nippon Soda Co., Ltd.;

Amicure MY-H and Amicure PN-50 represent amine adducts manufactured by Ajinomoto Fine-Techno Co., Inc.; and FXR-1030 represents a urea adduct manufactured by Ajinomoto Fine-Techno Co., Inc.

TABLE 1

| Composition of adhesive | | Example 1 | 2 | 3 | 4 | 5 | 6 | 7 | 8 | 9 | 10 |
|---|---|---|---|---|---|---|---|---|---|---|---|
| Bisphenol A type epoxy resin | JER828 (liquid) | 100 | 100 | 100 | 100 | 100 | 100 | 100 | 100 | 100 | 100 |
| | JER1001 (solid, Tg = 64° C.) | 100 | 100 | 100 | 100 | 100 | 100 | 100 | 180 | 100 | 100 |
| | JER1009 (solid, Tg = 144° C.) | — | — | — | — | — | — | — | — | — | — |
| Acryl-based resin | W-197C (EA-MMA) | — | — | — | — | — | — | — | — | — | — |
| | SK-Dyne 1495 (acryl-vinyl acetate copolymer) | — | — | — | — | — | — | — | — | — | — |
| | LC#6500 (PMMA) | — | — | — | — | — | — | — | — | — | — |
| | SM4032XM10 (modified PMMA-BA-PMMA) | 30 | 10 | — | — | — | — | — | 30 | — | — |
| | M22 (PMMA-BA-PMMA) | — | — | 30 | 10 | — | — | — | — | 30 | — |
| | M22N (modified PMMA-BA-PMMA) | — | — | — | — | 30 | 10 | 30 | — | — | 30 |
| KBM-403 (silane coupling agent) | | — | — | — | — | — | — | — | 4 | 4 | — |
| Curing agent/curing accelerator | DICY7 (dicyandiamide) | 7 | 7 | 7 | 7 | 7 | 7 | 8 | 7 | 7 | 11 |
| | HIPA-2E4MZ (inclusion imidazole) | 5 | 5 | 5 | 5 | 5 | 5 | — | 5 | 5 | — |
| | Amicure MY-H (amine adduct) | — | — | — | — | — | — | 5 | — | — | 7 |
| | Amicure PN-50 (amine adduct) | — | — | — | — | — | — | — | — | — | — |
| | FXR-1030 (urea adduct) | — | — | — | — | — | — | — | — | — | — |

| Composition of adhesive | | Example 11 | 12 | 13 | 14 | Comparative Example 1 | 2 | 3 | 4 | 5 |
|---|---|---|---|---|---|---|---|---|---|---|
| Bisphenol A type epoxy resin | JER828 (liquid) | 100 | 100 | 100 | 100 | 100 | 100 | 100 | 100 | 200 |
| | JER1001 (solid, Tg = 64° C.) | 100 | 100 | — | — | 100 | 100 | 100 | 100 | — |
| | JER1009 (solid, Tg = 144° C.) | — | — | 100 | 100 | — | — | — | — | — |
| Acryl-based resin | W-197C (EA-MMA) | — | — | — | — | — | 30 | — | — | — |
| | SK-Dyne 1495 (acryl-vinyl acetate copolymer) | — | — | — | — | — | — | 30 | — | — |
| | LC#6500 (PMMA) | — | — | — | — | — | — | — | 30 | 30 |
| | SM4032XM10 (modified PMMA-BA-PMMA) | — | — | — | — | — | — | — | — | — |
| | M22 (PMMA-BA-PMMA) | — | — | — | — | — | — | — | — | — |
| | M22N (modified PMMA-BA-PMMA) | 30 | 30 | 30 | 30 | — | — | — | — | — |
| KBM-403 (silane coupling agent) | | — | — | — | — | — | — | — | — | — |
| Curing agent/curing accelerator | DICY7 (dicyandiamide) | 11 | 11 | 8 | 7 | 7 | 7 | 7 | 7 | 7 |
| | HIPA-2E4MZ (inclusion imidazole) | — | — | — | 5 | 5 | 5 | 5 | 5 | 5 |
| | Amicure MY-H (amine adduct) | — | — | 5 | — | — | — | — | — | — |
| | Amicure PN-50 (amine adduct) | 7 | — | — | — | — | — | — | — | — |

TABLE 1-continued

| | | | | | | | | | | |
|---|---|---|---|---|---|---|---|---|---|---|
| FXR-1030 (urea adduct) | — | 7 | — | — | — | — | — | — | — | — |

<Preparation of Adhesive Sheet>

Each obtained adhesive was applied to the surface of a core (VECRUS MBBK6FZSO) laminated on a sepa film (SP-PET 03BU, manufactured by Tohcello Co., Ltd.), using a comma coater such that the amount of application was 100 g/m², to allow impregnation of the core with the adhesive, thereby forming an adhesive layer By laminating a sepa film (SP-PET 01BU, manufactured by Tohcello Co., Ltd.) on the adhesive layer, an adhesive sheet was prepared.

<Preparation of Laminated Body>

The obtained adhesive sheet was cut into a piece of 25 mm×12.5 mm, and one of the sepa films was peeled off to expose the adhesive layer, followed by attaching the adhesive layer to a tip portion of a CFRP adherend (length, 100 mm; width, 25 mm; thickness, 1.5 mm). From the adhesive sheet attached to the CFRP, the sepa film was peeled off to expose the adhesive layer. To the adhesive layer portion, a tip portion of another CFRP adherend (length, 100 mm; width, 25 mm; thickness, 1.5 mm) was attached.

Subsequently, a load of 3 kg was applied on the temporarily fixed adherend, and heat curing was carried out at 130° C. for 2 hours, to obtain a laminated body.

<Evaluation of Bonding Strength>

Each obtained laminated body was evaluated for its bonding strength under environments at room temperature (25° C.) or at 80° C. Both ends of the sample obtained above were fixed to Tensilon (RTA-1T, manufactured by Orientec), and pulled at 1 mm/min. to measure the shear strength. The evaluation results were as shown in Table 2 below.

<Evaluation of Film-Forming Properties>

To a sepa film (SP-PET 01BU, manufactured by Tohcello Co., Ltd.), each adhesive was applied using a comma coater such that the amount of application after drying was 50 g/m², and drying was carried out at 100° C. for 3 minutes, followed by observation of the external appearance of the coated surface. The evaluation criteria were as follows.

◯: The coating showed uniform thickness (±5 μm).

x: There is an area where the adhesive was repelled and could not be applied on the surface of the sepa film.

The evaluation results were as shown in Table 2 below.

The invention claimed is:

1. An adhesive composition comprising:
    an epoxy-based resin;
    an acryl-based resin comprising a modified triblock copolymer of methyl methacrylate-butyl acrylate-methyl methacrylate, at least one amide group being introduced into the modified triblock copolymer; and
    a curing agent,
    wherein the adhesive composition, when in a laminated body, provides a shear strength of at least 18.55 MPa when the laminated body is pulled at 1 mm/min at 25° C., and at least 17.3 MPa when the laminated body is pulled at 1 mm/min at 80° C., the laminated body being obtained by laminating two carbon fiber reinforced plastic adherends with the adhesive composition and then applying a 3 kg load to the laminate body to cure the adhesive composition at 130° C. for 2 hours, each of the carbon fiber reinforced plastic adherends having a 100 mm length, 25 mm width, and 1.5 mm thickness.

2. The adhesive composition according to claim 1, wherein said epoxy-based resin comprises a bisphenol epoxy resin.

3. The adhesive composition according to claim 1, wherein said epoxy-based resin comprises a bisphenol epoxy resin which is in a liquid state at normal temperature, and a bisphenol epoxy resin whose glass transition temperature is within the range of 50 to 150° C. and which is in a solid state at normal temperature.

4. The adhesive composition according to claim 1, wherein the mixing ratio between said epoxy-based resin and said acryl-based resin is 100:4 to 100:20.

5. The adhesive composition according to claim 3, comprising said bisphenol epoxy resin which is in a liquid state at normal temperature and said bisphenol epoxy resin which is in a solid state at normal temperature at a ratio of 100:300 to 300:100.

6. The adhesive composition according to claim 1, comprising 140 to 260 parts by mass of said epoxy-based resin, 10 to 50 parts by mass of said acryl-based resin, and 1 to 30 parts by mass of said curing agent.

TABLE 2

| | | Example | | | | | | | | | | | | | | Comparative Example | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 1 | 2 | 3 | 4 | 5 |
| Shear strength (MPa) | 25° C. | 22.4 | 27.5 | 18.55 | 19.85 | 34.3 | 34.9 | 31 | 27.45 | 20.3 | 28.3 | 24.3 | 21.5 | 33.0 | 31.2 | 11.0 | 5 | 8.1 | 10.2 | 9.9 |
| | 80° C. | 20.1 | 23.2 | 18.5 | 18.5 | 28.6 | 29.6 | 26 | 24.1 | 17.3 | 20.5 | 20.1 | 19.3 | 25.6 | 22.1 | 10.2 | 2 | 6 | 9.3 | 9.1 |
| Film-forming property | | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | x |

DESCRIPTION OF SYMBOLS

1: Adhesive sheet
11: Adhesive layer
13: Adhesive
15: Core
21: Release paper
21A: First release paper
21B: Second release paper 7. The adhesive composition according to claim 1, wherein said modified triblock copolymer comprises methyl methacrylate units and butyl acrylate units at a ratio of 1:1 to 50:1.

8. The adhesive composition according to claim 1, wherein the adhesive composition has a sea-island structure in which said epoxy-based resin is the sea and said acryl-based resin is the island in said adhesive composition.

9. The adhesive composition according to claim 1, wherein the amide group is introduced into a methyl methacrylate block of said modified triblock copolymer.

10. The adhesive composition according to claim 1, wherein:
said epoxy-based resin comprises a bisphenol epoxy resin which is in a liquid state at normal temperature, and a bisphenol epoxy resin whose glass transition temperature is within the range of 50 to 150° C. and which is in a solid state at normal temperature, and
the mixing ratio between said epoxy-based resin and said acryl-based resin is 100:4 to 100:20.

11. An adhesive sheet comprising:
a first release paper;
a second release paper; and
an adhesive layer arranged between said first release paper and said second release paper,
wherein said adhesive layer comprises the adhesive composition according to claim 1.

12. The adhesive sheet according to claim 11, wherein said adhesive layer further comprises a core impregnated with said adhesive composition.

13. A method of bonding a first adherend and a second adherend using the adhesive sheet according to claim 11, said method comprising the steps of:
removing said first release paper from a first surface of said adhesive layer;
removing said second release paper from a second surface of said adhesive layer;
attaching said first surface of said adhesive layer to said first adherend to temporarily fix said first adherend;
attaching said second surface of said adhesive layer to said second adherend to temporarily fix said second adherend; and
curing said adhesive layer by heating to bond said first adherend and said second adherend.

14. A laminated body obtained by the method according to claim 13.

15. The method of bonding a first adherend and a second adherend according to claim 13, wherein said first adherend and said second adherend are each made of metal.

16. The method of bonding a first adherend and a second adherend according to claim 13, wherein said first adherend is made of metal and said second adherend is made of organic material.

17. The method of bonding a first adherend and a second adherend according to claim 13, wherein said first adherend and said second adherend are each made of organic material.

18. The method of bonding a first adherend and a second adherend according to claim 13, wherein said first adherend is made of aluminum and said second adherend is made of iron.

19. The method of bonding a first adherend and a second adherend according to claim 13, wherein said first adherend is made of a fiber-reinforced carbon material.

* * * * *